US006866306B2

(12) United States Patent
Boyle et al.

(10) Patent No.: US 6,866,306 B2
(45) Date of Patent: Mar. 15, 2005

(54) LOW-LOSS INDUCTIVE COUPLERS FOR USE IN WIRED PIPE STRINGS

(75) Inventors: Bruce W. Boyle, Brookfield, CT (US); Raghu Madhavan, Brookfield, CT (US); Jacques Jundt, Bethel, CT (US)

(73) Assignee: Schlumberger Technology Corporation, Ridgefield, CT (US)

( * ) Notice: Subject to any disclaimer, the term of this patent is extended or adjusted under 35 U.S.C. 154(b) by 0 days.

(21) Appl. No.: 09/881,333

(22) Filed: Jun. 14, 2001

(65) Prior Publication Data

US 2002/0135179 A1 Sep. 26, 2002

Related U.S. Application Data

(60) Provisional application No. 60/278,090, filed on Mar. 23, 2001.

(51) Int. Cl.[7] ................................................. F16L 25/00
(52) U.S. Cl. ...................... 285/333; 285/9.1; 285/332.1; 175/40; 166/66.5; 340/854.4; 340/854.5; 340/854.6; 367/82; 439/950
(58) Field of Search .............................. 285/9.1, 332.1, 285/333, 334; 175/40; 166/65.1, 66.5; 340/854.4, 854.5, 854.6; 367/82; 439/950

(56) References Cited

U.S. PATENT DOCUMENTS 2,354,887 A * 8/1944 Silverman et al. ........ 340/854.6

(List continued on next page.)

FOREIGN PATENT DOCUMENTS

EP 1 158 138 A2 11/2001

(List continued on next page.)

OTHER PUBLICATIONS http://www.netl.doe.gov/publications/press/1999/tl%5Fsmartdril1.html U.S. Dept, of Energy Press Release, Oct. 13, 1999, "DOE Selects California Small Business to Help Develop 'Smart Drilling System' for Oil & Natural Gas".

The Oil and Gas Journal, Apr. 1978, pp 115–124, W. J. McDonald, "Four Different Systems Used for MWD".

ACPT Presentation, Aug. 2000, Slide 25 of 29, "Cost Effective Composite Drill Pipe".

*Primary Examiner*—James M. Hewitt
(74) *Attorney, Agent, or Firm*—John L. Lee; William B. Batzer; Dale Gaudier

(57) ABSTRACT

A first flux-loop inductive coupler element electrically couples with a second flux-loop inductive coupler element. The first flux-loop inductive coupler element comprises a first ring-like core having high magnetic permeability and a conical-section annular first face transverse to the plane of the first core. The first face has a first annular groove separating a first conical-section larger-diameter face and a first conical-section smaller-diameter face. A first coil is wound within the annular groove. The first and second cores form a low-reluctance closed magnetic path around the first coil and a second coil of the second flux-loop inductive coupler element.

A first current-loop inductive coupler element electrically couples with a second current-loop inductive coupler element. The first current-loop inductive coupler element has a first high-conductivity, low-permeability shaped belt of a first end of a first pipe joint, a first ring-like core located at the first end, and a first electrically conductive coil wound about the first ring-like core. The first high-conductivity, low-permeability shaped belt partially encloses the first coil. It is shaped to cooperate with the second high-conductivity, low-permeability shaped belt of an adjacent second pipe joint having a second electrically conductive coil and a second high-conductivity, low-permeability shaped belt to create a closed toroidal electrical conducting path. The closed toroidal electrical conducting path encloses the first coil and the second coil when the first and second pipe joints are mated.

10 Claims, 11 Drawing Sheets

U.S. PATENT DOCUMENTS

| | | |
|---|---|---|
| 2,379,800 A | 7/1945 | Hare |
| 2,414,719 A | 1/1947 | Cloud |
| 3,079,549 A | 2/1963 | Martin |
| 3,090,031 A | 5/1963 | Lord |
| 3,807,502 A | 4/1974 | Heilhecker et al. ......... 166/315 |
| 3,957,118 A | 5/1976 | Barry et al. ................ 166/315 |
| 4,126,848 A | 11/1978 | Denison ................ 340/18 LD |
| 4,445,734 A | 5/1984 | Cunningham |
| 4,578,675 A * | 3/1986 | MacLeod ................ 340/853.7 |
| 4,605,268 A | 8/1986 | Meador ................... 339/16 C |
| 4,630,243 A * | 12/1986 | MacLeod ..................... 367/82 |
| 4,806,928 A | 2/1989 | Veneruso .................... 340/856 |
| 4,901,069 A | 2/1990 | Veneruso .................... 340/853 |
| 4,914,433 A | 4/1990 | Galle |
| 5,008,664 A | 4/1991 | More et al. |
| 5,052,941 A | 10/1991 | Hernandez-Marti et al. ................. 439/194 |
| 5,278,550 A | 1/1994 | Rhein-Knudsen et al. ......... 340/855.1 |
| 5,521,592 A | 5/1996 | Veneruso ................. 340/854.8 |
| 5,626,190 A * | 5/1997 | Moore ....................... 166/65.1 |
| 5,971,072 A | 10/1999 | Huber et al. ................ 166/297 |
| 6,092,610 A * | 7/2000 | Kosmala et al. .............. 175/61 |
| 6,188,222 B1 * | 2/2001 | Seydoux et al. ............. 324/339 |
| 6,515,592 B1 * | 2/2003 | Babour et al. ........... 340/854.4 |
| 6,670,880 B1 * | 12/2003 | Hall et al. .................. 336/132 |

FOREIGN PATENT DOCUMENTS

| | | |
|---|---|---|
| RU | 2040691 C1 | 2/1992 |
| RU | 2140537 | 12/1997 |
| WO | WO 90/14497 | 11/1990 |
| WO | WO 02/06716 A1 | 1/2002 |

* cited by examiner

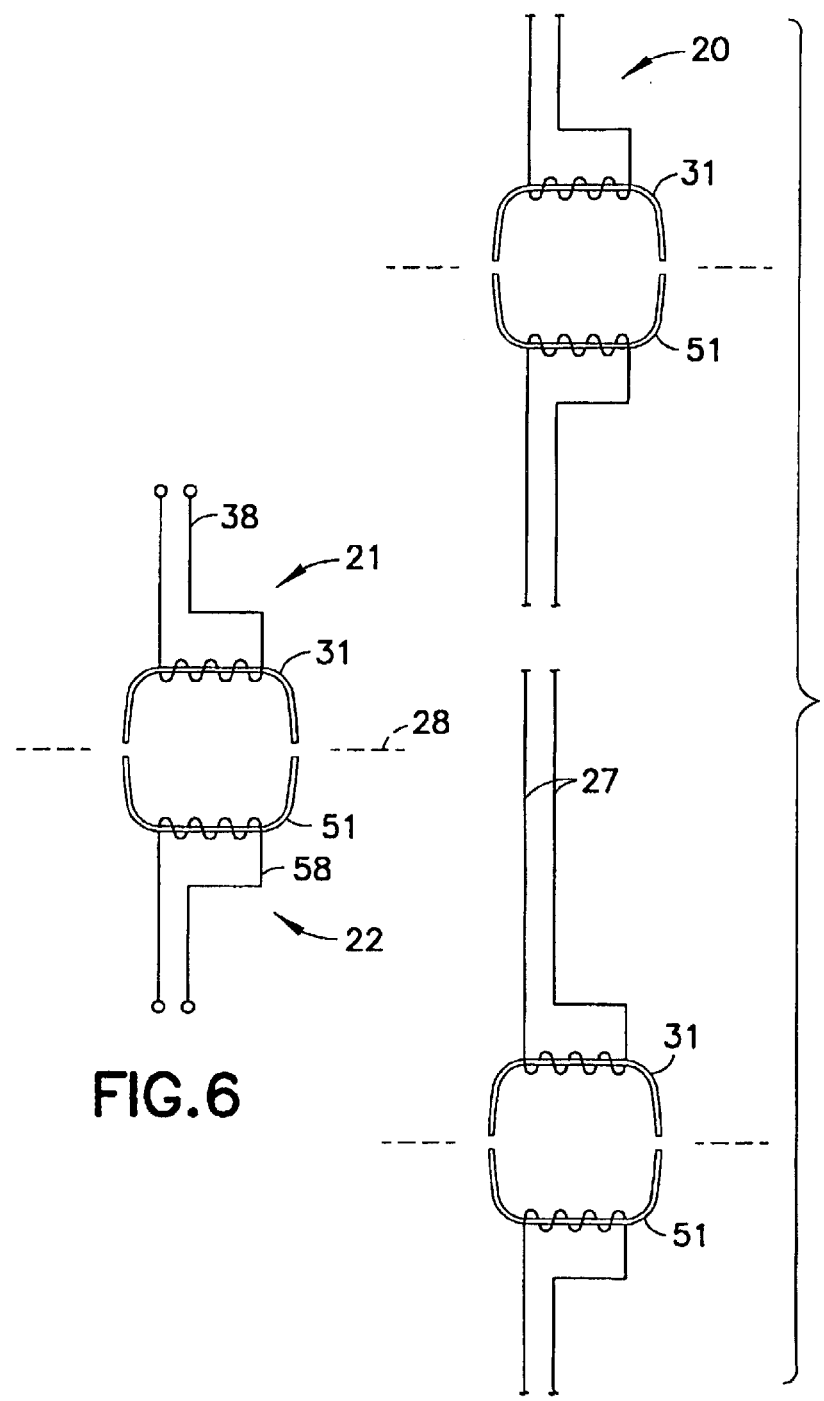
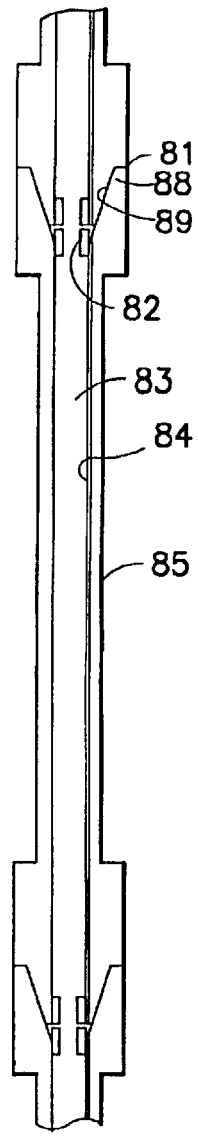
FIG.6
FIG.7
FIG.8

LOW-LOSS INDUCTIVE COUPLERS FOR USE IN WIRED PIPE STRINGS

This application claims the benefit of Provisional Application No. 60/278,090, filed Mar. 23, 2001.

TECHNICAL FIELD

The present invention relates to apparatus and methods used in oil well drilling and oil well operations for transmitting measurement data to a surface station from locations in a borehole.

BACKGROUND OF THE INVENTION

Measurement While Drilling (MWD) and Logging While Drilling (LWD) systems derive much of their value from the ability to provide real-time information about conditions near the drill bit. Oil companies use these downhole measurements to make decisions during the drilling process, and sophisticated drilling techniques, such as the GeoSteering system developed by Schlumberger, Ltd. Such techniques rely heavily on instantaneous knowledge of the formation that is being drilled. The industry continues to develop new measurements for MWD/LWD, including imaging type measurements with high data content.

These new measurement and control systems require telemetry systems having higher data rates than those currently available. As a result, a number of telemetry techniques for use with measurement while drilling have been tried or proposed.

The industry standard is mud pulse telemetry that uses the drill pipe to guide acoustic waves in the drilling fluid. Currently, using mud pulse telemetry, data is sent to the surface at bit rates in the range of 1–6 bits/second. Such a slow rate is incapable of transmitting the large amounts of data that are typically gathered with an LWD string. In some cases (e.g., foamed drilling fluid), mud pulse telemetry does not work at all. Normally, some or all of the data is stored in downhole memory and downloaded at the end of the bit run. This delay significantly reduces the value of the data for real-time applications. Also, there is a significant risk of data loss, for example, if the tool is lost in the hole.

Electromagnetic telemetry via earth path has been tried with limited success. Even at very low data rates, it works only to a limited depth, depending on the resistivity of the earth.

Acoustic telemetry through the drill pipe itself has been studied extensively but not used commercially, so far. In theory, data rates in the 10's of bits/second should be possible using acoustic waves in the steel.

The idea of putting a wire in the drill pipe has been proposed numerous times over the past 25 years. Shell and Exxon each reportedly built an experimental wired drill string in the late 1970's. Prior art relating to these efforts is disclosed in U.S. Pat. No. 4,126,848 to Denison, "Drill String Telemeter System"; U.S. Pat. No. 3,957,118 to Barry et al., "Cable System for use in a Pipe String and Method for Installing and Using the same"; and U.S. Pat. No. 3,807,502 to Heilhecker et al., "Method for Installing an Electric Conductor in a Drill String"; and the publication "Four Different Systems Used for MWD", W. J. McDonald, The Oil and Gas Journal, pp 115–124, 3 Apr. 1978. Such systems are believed to have suffered from poor reliability and high cost because of the large number of electrical connectors.

IFP developed a system known as "Simphor" which used wireline cables and large, robust wet connectors. It has never been commercialized for measurement while drilling applications. This system is believed to have suffered from interference with the drilling process.

The use of inductive couplers in drill pipe is known. U.S. Pat. No. 4,605,268, to Meador, "Transformer cable connector" describes the use and basic operation of inductive couplers mounted at the sealing faces of drill pipes. Russian patent 2,140,537, "A system for transmitting electrical energy and data within a column of adjoining tubes", November 1999, describes a drill pipe telemetry system that uses inductive couplers. WO Publication 90/14497A2, by Eastman Christensen GMBH, "Process and device for transmitting data signals and/or control signals in a pipe train" describes an inductive coupler mounted at the ID of the drill pipe joint for data transfer.

Other U.S. patents are as follows: U.S. Pat. No. 5,052,941 to Hernandez-Marti et al., "Inductive coupling connector for a well head equipment"; U.S. Pat. No. 4,806,928 to Veneruso, "Apparatus for electro-magnetically coupling power and data signals between well bore apparatus and the surface"; U.S. Pat. No. 4,901,069 to Veneruso, "Apparatus for electro-magnetically coupling power and data signals between a first unit and a second unit and in particular between well bore apparatus and the surface"; U.S. Pat. No. 5,521,592 to Veneruso; "Method and apparatus for transmitting information relating to the operation of a downhole electrical device"; U.S. Pat. No. 5,278,550 to Rhein-Knudsen, et al., "Apparatus and method for retrieving and/or communicating with downhole equipment"; and U.S. Pat. No. 5,971,072 to Huber et al., "Inductive coupler activated completion system".

None of these references has provided a telemetry system for reliably transmitting measurement data at high data rates from locations near the drill bit to a surface station. Therefore, there exists a need for a telemetry system for reliably transmitting measurement data at high data rates to a surface station from locations in a borehole.

SUMMARY OF THE INVENTION

The invention provides a family of low-loss inductive couplers for use in wired pipe strings. The invention provides two groups of embodiments, flux-loop embodiments and current-loop embodiments.

A first embodiment includes a first flux-loop inductive coupler element with a ring-like first core having high magnetic permeability, the first core defining a first exterior substantially cylindrical face and a first interior conical-section annular face.

The first interior face defines a first interior conical-section annular larger-diameter face (herein below referred to as "first larger-diameter face"), a first interior conical-section annular smaller-diameter face (herein below referred to as "first smaller-diameter face"), and an annular first groove. The first groove is located between the first larger-diameter face and the first smaller-diameter face. The first element further includes a first electrically conductive coil wound within the first groove. The first embodiment further includes a second flux-loop inductive coupler element with a ring-like second core having high magnetic permeability, the second core defining a second interior substantially cylindrical face and a second exterior conical-section annular face.

The second exterior face defines a second exterior conical-section annular smaller-diameter face (herein below referred to as "second smaller-diameter face"), a second exterior conical-section annular larger-diameter face (herein below referred to as "second larger-diameter face"), and an annular second groove. The second groove is located between the second smaller-diameter face and the second larger-diameter face. The second element further includes a second electrically conductive coil wound within the second groove. The first and second elements are adapted to mate with first larger-diameter facing second larger-diameter face, and with first smaller-diameter face facing second smaller-diameter face. The first and second cores form a low-reluctance closed magnetic path around the first and second coils.

A second embodiment includes a first current-loop inductive coupler element having a first high-conductivity, low-permeability shaped belt of a first end of a first pipe joint, a first ring-like core located at the first end, and a first electrically conductive coil wound about the first ring-like core. The first high-conductivity, low-permeability shaped belt partially encloses the first coil. It is shaped to cooperate with the second high-conductivity, low-permeability shaped belt of an adjacent second pipe joint having a second electrically conductive coil and a second high-conductivity, low-permeability shaped belt to create a closed toroidal electrical conducting path. The closed toroidal electrical conducting path encloses the first coil and the second coil when the first and second pipe joints are mated.

BRIEF DESCRIPTION OF THE DRAWINGS

FIG. 6 is an electromagnetic model of the first element of the embodiment of FIG. 1.

FIG. 7 is an electromagnetic model of the wired pipe joint of FIG. 3.

FIG. 8 is a cross section view of a wired pipe joint having low-loss flux-loop inductive couplers similar to those shown in FIG. 1.

DETAILED DESCRIPTION

General

The invention provides a low-loss inductive coupler for use in wired pipe joint components of a wired drill string. Two main versions are disclosed: flux-loop versions and current-loop versions.

First Embodiment

Figure 1:
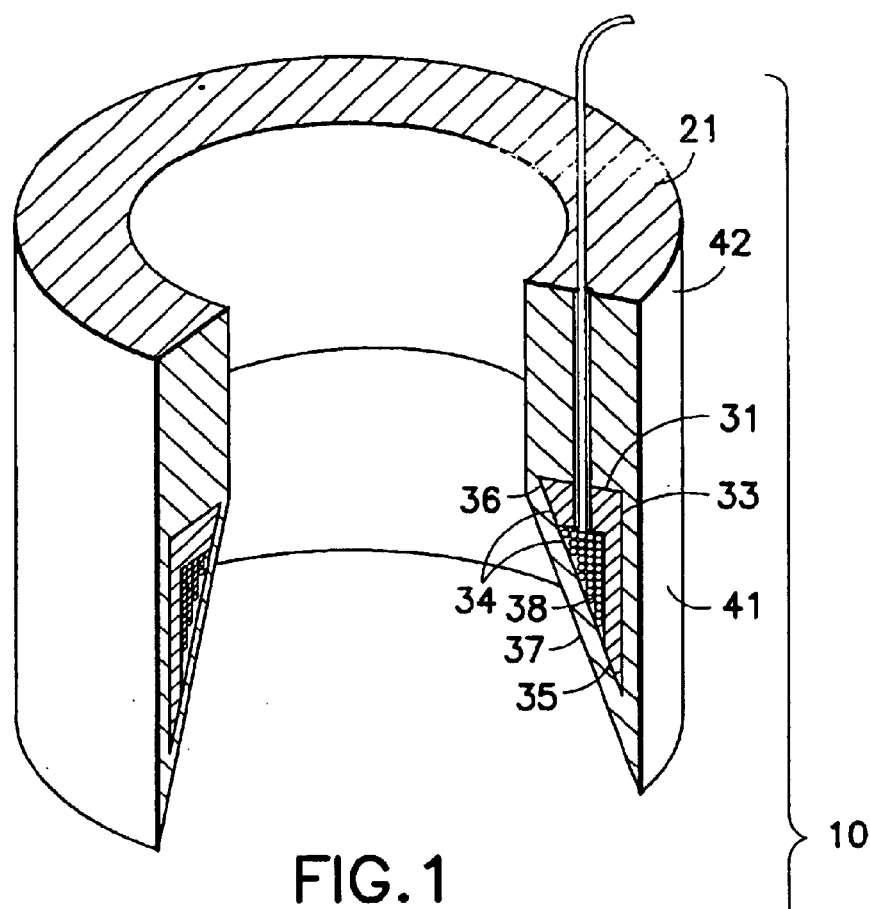
FIG. 1 is a partially cut away perspective view of a first embodiment of a low-loss inductive coupler according to the present invention having flux-loop inductive coupler elements.
Figure 1:
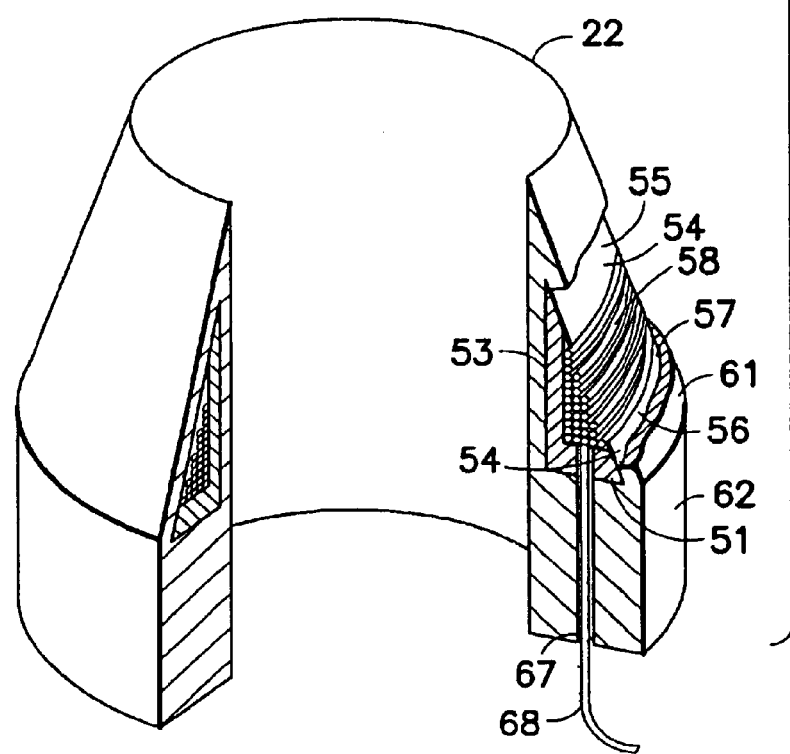

FIG. 1 is a partially cut away perspective view of a first (flux-loop) embodiment of an inductive coupler according to the present invention. FIG. 1 shows low-loss flux-loop inductive coupler 10 having a first flux-loop inductive coupler element 21 and a second flux-loop inductive coupler element 22. Element 21 includes a ring-like first core 31 having high magnetic permeability. First core 31 is shown enclosed within first protective coating 41 that also defines thick cylindrical first end 42. (In some embodiments the protective coating is omitted.) First core 31 defines a first exterior substantially cylindrical face 33 and a first interior conical-section annular face 34. First interior face 34 defines a first interior conical-section annular larger-diameter face 35 (herein below referred to as "first larger-diameter face"), a first interior conical-section annular smaller-diameter face 36 (herein below referred to as "first smaller-diameter face"), and an annular first groove 37. First groove 37 is located between first larger-diameter face 35 and first smaller-diameter face 36. First element 21 further includes first electrically conductive coil 38 wound within first groove 37, and substantially concentric with first core 31. Element 22 includes a ring-like second core 51 having high magnetic permeability. Second core 51 is shown enclosed within second protective coating 61 that defines thick cylindrical second end 62. Second core 51 defines a second interior substantially cylindrical face 53 and a second exterior conical-section annular face 54. Second exterior face 54 defines a second exterior conical-section annular smaller-diameter face 55 (herein below referred to as "second smaller-diameter face"), a second exterior conical-section annular larger-diameter face 56 (herein below referred to as "second larger-diameter face"), and an annular second groove 57. Second groove 57 is located between second smaller-diameter face 55 and second larger-diameter face 56. Second element 22 further includes second electrically conductive coil 58 wound within second groove 57, and substantially concentric with second core 51.

Figure 2:
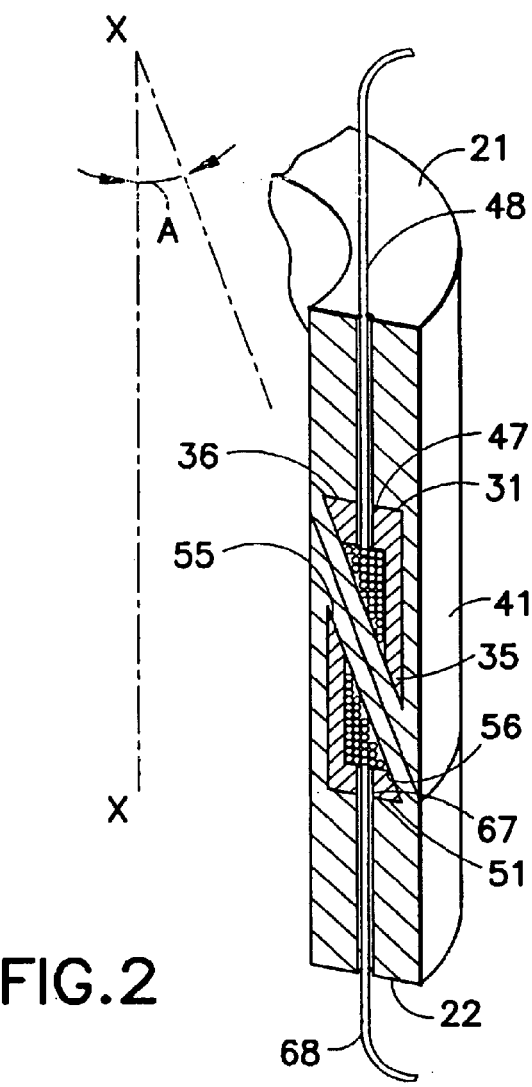
FIG. 2 is a perspective view of mated first and second flux-loop inductive coupler elements of the embodiment of FIG. 1.

FIG. 2 is a perspective view of mated first and second flux-loop inductive coupler elements of the embodiment of FIG. 1. First and second elements 21 and 22 are adapted to mate with first larger-diameter face 35 facing second larger-diameter face 56, and with first smaller-diameter face 36 facing second smaller-diameter face 55.

FIG. 2 shows faces 35 and 36 defining a cone with an apex, on axis X—X of the first core, defining angle A between faces 35 and 36 and axis X—X. The associated exterior faces, 55 and 56, define a cone with a corresponding apex on the axis of the second core.

FIG. 2 further shows first conduit 47 in first core 31 providing a passage for one or more electrical cables 48 into the interior of the wired pipe joint. Likewise, second conduit 67 in second core 51 provides a passage for one or more electrical cables 68 into the interior of the adjacent wired pipe joint. (The wired pipe joints are not shown in FIG. 2.)

Figure 3:
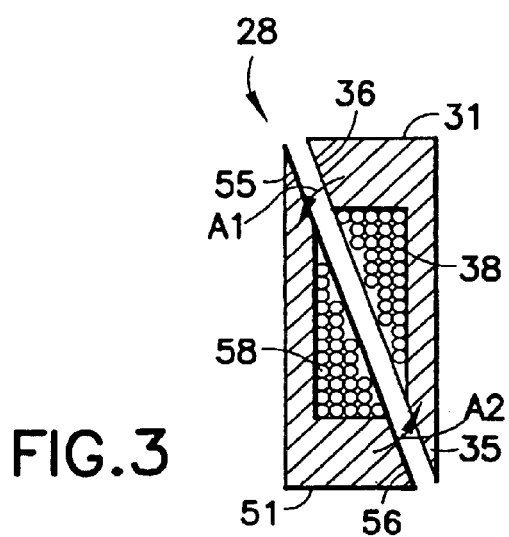
FIG. 3 is an expanded cross section view of mated elements of the embodiment of FIG. 1 showing magnetic flux loop crossing the gap between the two cores.

FIG. 3 is an expanded cross section view of mated elements of the embodiment of FIG. 1. FIG. 3 shows magnetic flux loop crossing gap 28 between cores 31 and 51. When first and second elements 21 and 22 are mated, first and second cores 31 and 51 form a low-reluctance closed ring-like magnetic path around the first and second coils. Arrows A1 and A2 indicate the closed magnetic path crossing gap 28 between cores 31 and 51, and encircling first and second coils 38 and 58. FIG. 3 shows coils 38 and 58 occupying, by design, a relatively small portion of gap 28 between the facing cores. In one embodiment angle A is, by design, an acute angle of approximately 25°. These design features maximize the area of facing cores, within constraints imposed by the need for mechanical robustness, to minimize electromagnetic energy losses in each element.

Thus, each core has an annular face transverse to its plane defining a conical surface. Each annular face has a central annular groove dividing the annular face into a larger-diameter annular face and a smaller-diameter annular face. Each core has a coil wound within its annular groove. The coil does not substantially protrude forward of the conical face. The core defines a conduit for passage of at least one or more electrical cables from the coil to at least an opposite edge of the core. In some embodiments, there would be one conductor using the joint pipe wall as a return, two conductors or two or more pairs of conductors.

Inductive coupler elements are functionally symmetrical about the rotational axis of the drill string, in that they can transmit signals regardless of their relative orientation.

Figures 4, 5:
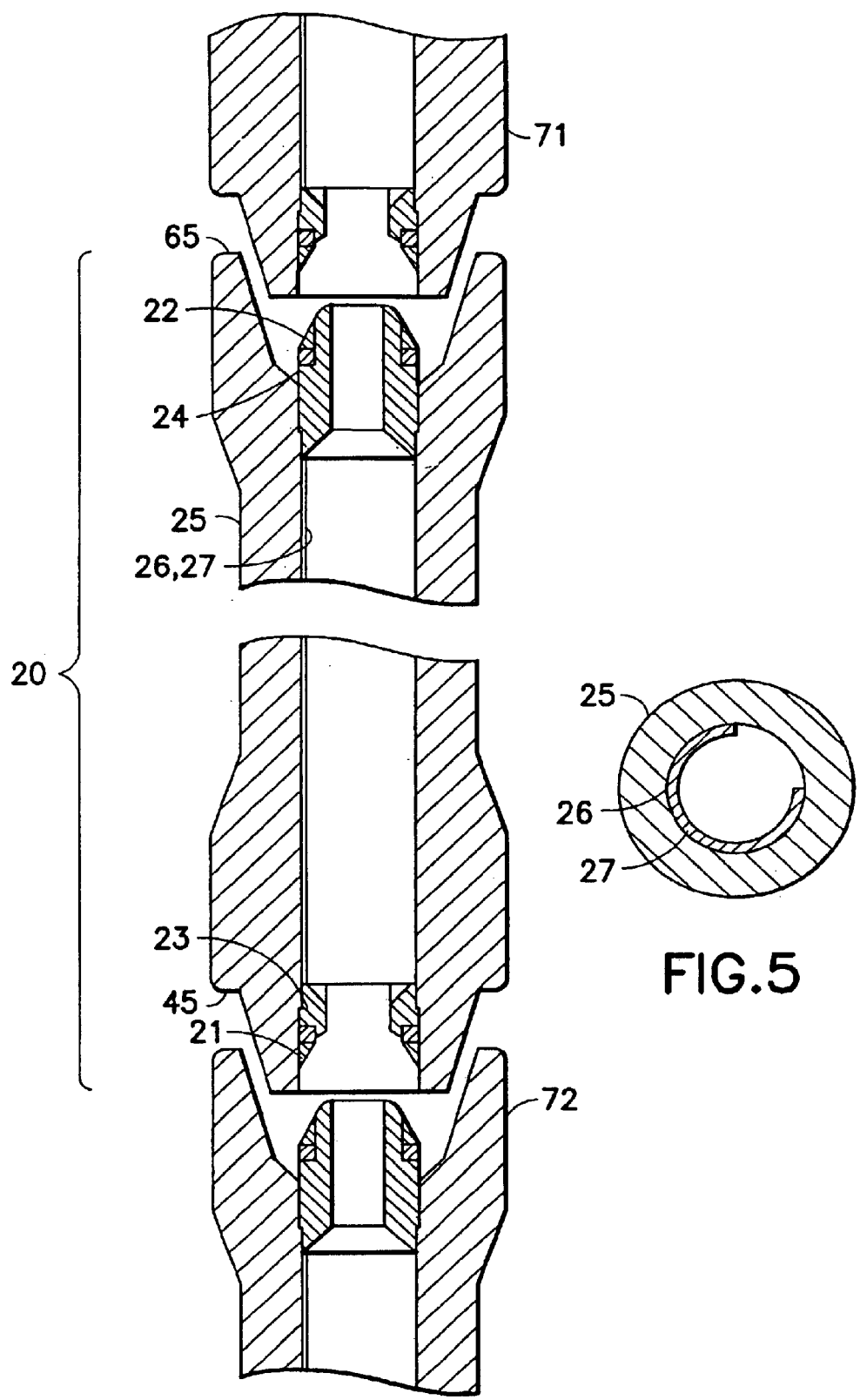
FIG. 4 is a cross section view of a wired pipe joint according to the present invention having first and second elements of the embodiment of FIG. 1.
FIG. 5 locates one or more electrical cables carried in a mandrel within the wired pipe joint of FIG. 3.

FIG. 4 is a cross section view of flux-loop wired pipe joint 20 according to the present invention. Wired pipe joint 20 includes first element 21 and second element 22 of the inductive coupler shown in FIG. 1. FIG. 4 shows wired pipe joint 20 between two adjacent wired pipe joints 71 and 72. Wired pipe joint 20 includes elongate tubular shank 25, electrical cable 27, first flux-loop inductive coupler element 21, and second flux-loop inductive coupler element 22. Shank 25 defines an axial bore, a first sealing face 45, and second sealing face 65. Electrical cable 27 extends along at least a portion of the interior of the bore. First element 21 is located within a first end of the shank and is connected to a first end of electrical cable 27. Second element 22 is located within a second end of the shank and is connected to a second end of electrical cable 27. First and second inductive coupler elements 21 and 22 are mounted to first and second tubular support members 23 and 24, respectively, within the bore of the pipe joint. Electrical cable 27 can be any electrically conductive means including a pair of wires, a twisted pair, a coaxial cable, a flex circuit, or a single wire (using the wall of the pipe joint as one of the conductors). Cable 27 could be located in a groove cut into the outer surface of the pipe joint. Alternatively, the cable could be in a gun drill hole within the length of the pipe joint wall, or could be within the pipe bore of the pipe joint as a secured cable, or could be installed as loose wires.

FIG. 5 shows a version of the embodiment of FIG. 4 having electrical cable 27 supported by mandrel 26. The mandrel and the cable are shown in cross sectional view located within the bore of shank 25. In another version, a mandrel in helical form is provided to allow easy insertion or removal. Twisting the mandrel to tighten the helix would reduce its diameter for easier insertion or removal. The mandrel's spring-like quality would hold it tightly within the pipe joint when twisting is released.

FIG. 6 is an electromagnetic model of first element 21 of the embodiment of FIG. 1. FIG. 6 shows first coil 38 and second coil 58 electro-magnetically coupled to first core 31 and second core 51, respectively. The first and second cores facing each other across gap 28 form a closed loop for magnetic flux.

FIG. 7 is an electromagnetic model of the wired pipe joint of FIG. 3.

Protective coating 41, shown in FIGS. 1 and 2, covers the wires and coils with an appropriate insulating material to withstand downhole conditions. However, the mating surfaces are only thinly coated or may be uncoated to ensure maximum coupling.

Mounting flux-loop inductive couplers at the drill string connections invariably results in some gap between the two core faces that affects efficiency. The gap between the cores is caused by tolerances in the connection features, change in dimensions from wear, the presence of a protective/hermetic coating on the cores, and the presence of any debris caught between the coupler halves. The magnetic flux that links the two halves of the coupler flows across this gap. Any magnetic flux that leaks while bridging this gap degrades the efficiency. The leakage of magnetic flux into the steel that surrounds the ferrite cores is another source for losses. Any conductive fluid, such as a water-based mud, that may occupy this gap will allow the circulation of eddy currents and give rise to additional losses.

The cores, by design, have an angular shape to reduce any flux loss at the gap and increase efficiency. A drill string coupling configuration that minimizes the gap between the coupler halves provides optimal performance. Pipe joints with close tolerances at the connection points and hard mounted couplers can provide reduced gaps. Another possibility is to spring load and float one or both of the coupler halves to help remove any debris and so reduce the gap, while using standard pipe joints. Having a large gap between cores and the surrounding pipe joint walls can reduce flux leakage into the steel.

In one embodiment, the core is fabricated from a zinc-manganese ferrite material, by grinding or casting suitable pieces. The core may be produced as a continuous ring or in segments that are assembled into a continuous ring. Because the flux lines travel around the edges of the coupler (not along its circumference), the core need not be a continuous ring because the flux is transverse to the circumference of the ring. It may be made up of individual ferrite segments that are assembled into a segmented ring, though the winding of course would be continuous along its circumference. Alternatively, it may be made up of individual thin steel segments, effectively a laminated structure.

A variant on the embodiment shown in FIGS. 4 and 5 is illustrated in FIG. 8. In this embodiment the mandrel supports both the electrical cable and the inductive couplers. As illustrated in FIG. 8, inductive coupler elements 81 and 82 are supported on a mandrel 83 that carries electrical cable 84 and is inserted in each pipe joint, preferably while it is still on the pipe rack. The mandrel is designed to support and protect the cable that connects the two inductive coupler elements of the wired pipe joint. The pipe joint provides structural support for mandrel 83. The mandrel is formed as an elongated section from a lightweight cylinder of fiber-reinforced composite or sheet metal sliced lengthwise. When not enclosed by the pipe joint, the mandrel has a diameter that is larger than the internal diameter of the pipe joint. As illustrated in FIG. 8, mandrel 83 with its cable 84 is inserted in pipe joint 85. (See also FIG. 5, showing lightweight mandrel 26 inserted in elongate tubular shank 25.) After the mandrel is inserted, the elasticity of its semicircular cross section pushes against the wall of the pipe joint bore and holds it in place. Other methods, such as clips or springs, could be also used. FIG. 8 is a cross section view of a wired pipe joint having first and second flux-loop low-loss inductive couplers similar to those shown in FIG. 1. FIG. 8 also locates first and second sealing faces 88 and 89 with respect to inductive coupler elements 81 and 82.

Second Embodiment

Figure 9:
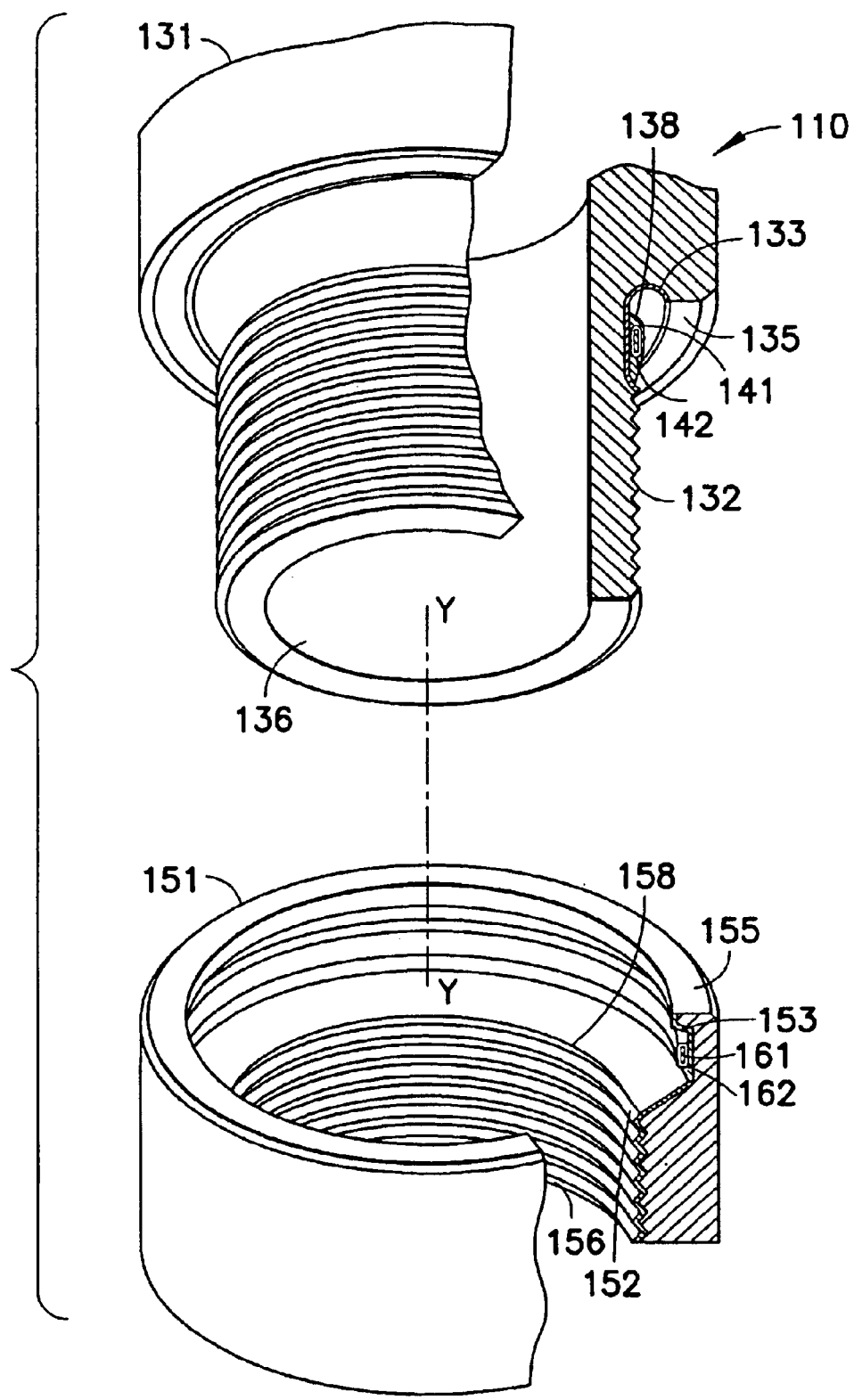
FIG. 9 is a partially cut away perspective view of a second embodiment of a low-loss inductive coupler according to the present invention having current-loop inductive coupler elements.
Figure 10:
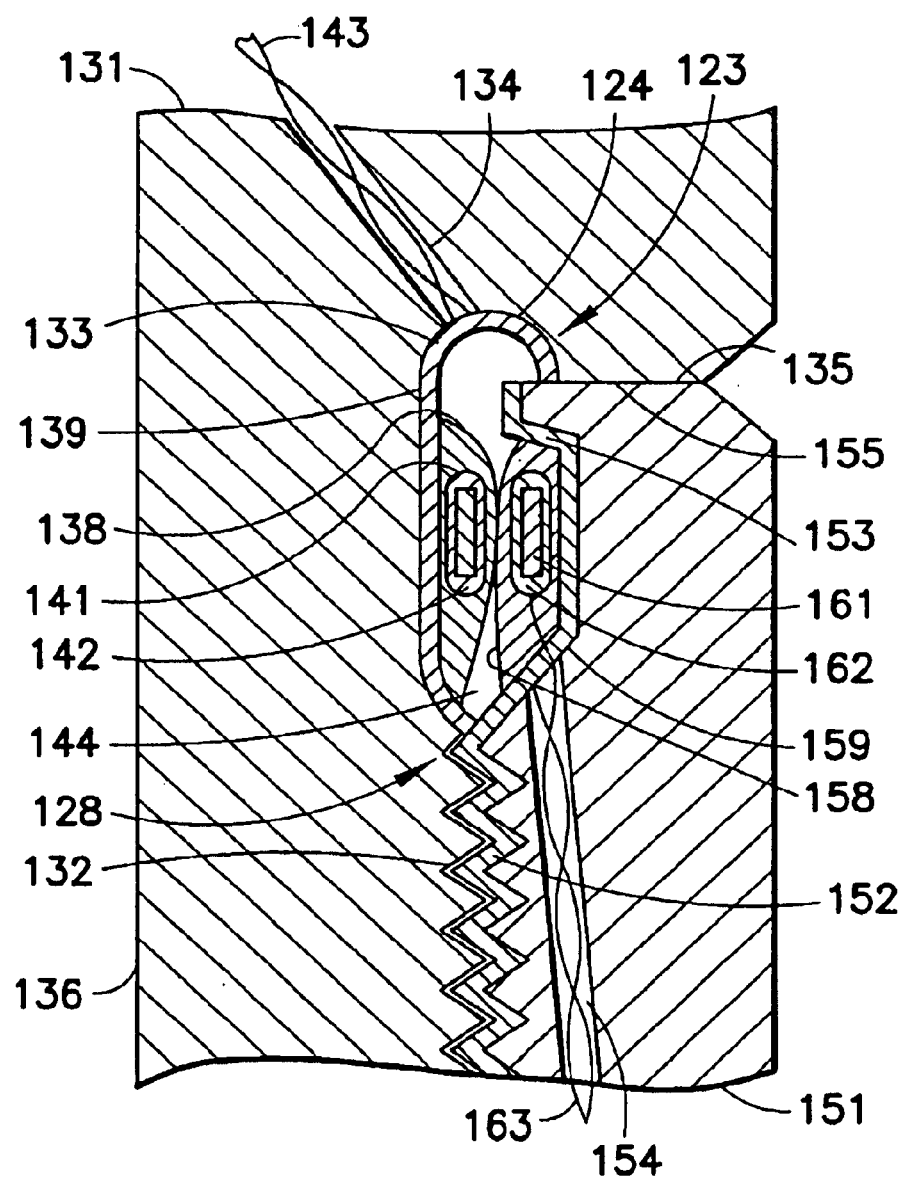
FIG. 10 is an enlarged cross section view of the electromagnetic components of the embodiment of FIG. 9.

FIG. 9 is a partially cut away perspective view of a second (current-loop) embodiment of an inductive coupler according to the present invention. FIG. 9 shows low-loss current-loop inductive coupler 110 having a first current-loop inductive coupler element 131 including a first high-conductivity, low-permeability layer defining first high-conductivity, low-permeability shaped belt 133, and a second current-loop inductive coupler element 151 including a second high-conductivity, low-permeability layer defining second high-conductivity, low-permeability shaped belt 153. FIG. 10 is an enlarged cross section view of the electromagnetic components of mated elements 131 and 151

A low-loss current-loop inductive coupler according to the second embodiment may be viewed as a pair of transformers connected back to back through the metal of the pipe joint connection.

Referring again to FIG. 9, first current-loop inductive coupler element 131 includes a first coil 142 wound about a first ring-like core 141 that is oriented in a plane transverse to axis Y—Y, surrounding first bore 136. Second current-loop inductive coupler element 151 includes a second coil 162 wound about a second ring-like core 161 that is oriented in a plane transverse to the axis of second current loop element 151, surrounding its axial bore. First element 131 includes a portion of first pipe joint connection, proximate to first connection threads, that has a first high-conductivity, low-permeability shaped belt 133 partially surrounding the first coil. Second element 151 includes a portion of second pipe joint connection, proximate to second connection threads, that has a second high-conductivity, low-permeability shaped belt 158 partially surrounding the second coil. First high-conductivity, low-permeability shaped belt is shaped to cooperate with a second high-conductivity, low-permeability shaped belt of an adjacent wired pipe joint. When a first wired pipe joint and an adjacent second wired pipe joint are mated, the first and second high-conductivity, low-permeability shaped belts create a closed electrical conducting toroidal path enclosing both the first coil of the wired pipe joint and the second coil of the adjacent wired pipe joint. The closed electrical conducting toroidal path may include a short portion of the wall of the pipe joint. The highly conductive path does not need to be continuous for the design to be effective. A short portion of steel shank surface bridging a gap in what is otherwise a high-conductivity, low-permeability path, would not have a significant effect. Also, while in its simplest form "toroidal path" suggests a solid surface, the closed electrical conducting path could be segmented along the major circumference of the toroid because current does not need to flow around the major circumference of the toroid.

Each coil induces an electrical current in the pipe joint itself, in particular, as invented by the inventors, along high-conductivity, low-permeability layers of the pipe joints. A layer of conductive material is attached to or coated on the pipe joint surfaces surrounding the two cores to reduce losses due to electrical resistance. The conductive material could be copper, copper alloy, aluminum, silver, or gold, i.e., any material that has a conductivity that is substantially higher than the conductivity of steel. The magnetic core material is selected to help minimize power losses and withstand the downhole environment. In most configurations, the current-loop inductive coupler includes a magnetic core carrying a winding on the order of a hundred turns of wire, and the coils are over-molded with rubber to help protect them from the environment.

As shown in FIG. 10, first coil 142 is located in toroidal cavity 144. Toroidal cavity 144 is defined by the open surface of first shaped belt 133 that is layered over first shaped surface 139 and by the open surface of second shaped belt 153 that is layered over second shaped surface 159. Cavity 144 is formed close to the threads and the sealing faces. First shaped belt 133 encircles the bore. Second shaped belt 153 encircles both the bore and first shaped belt 133. In this configuration, the coils are well protected from the drilling environment. Each coil is preferably hermetically molded with a protective coating of rubber, but other type of polymeric over-molding may be used.

A layer of high-conductivity, low permeability material (such as copper) is attached or plated to the surfaces of the grooves surrounding the two coils. This reduces the resistance to the electrical current that links the two cores. It also prevents the magnetic field from penetrating into the pipe material, thereby increasing the efficiency of the coupler. In some embodiments tested by the inventors, attenuation has been reduced to less than 0.2 dB per coupler. The high-conductivity, low-permeability layer need only be a few skin depths thick at the lowest frequency of operation (about 1 mm for the embodiment of FIGS. 9 and 10). In one embodiment, the conductive layer is formed by electroplating. Alternatively, it may be formed by electro-forming, explosive-forming, or other method known in the art. Preferably, the cavity in which the coil is placed is designed to minimize the path length along the surfaces in a radial plane. Suitable high-conductivity, low permeability materials include copper, copper alloys (such as brass, bronze or beryllium copper), silver, aluminum, gold, tungsten, and zinc (and alloys of these materials).

The magnetic core material is chosen to minimize the hysteresis and eddy current losses. Magnetic tape materials available under the names Supermalloy and Metglas® have been found to be suitable, though other materials might be used. Supermalloy is available from Magnetics®, a Division of Spang and Company, East Butler, Pa., USA. Metglas® is available from Honeywell Amorphous Metals, Morristown, N.J., USA.

The ring-like cores are preferably formed by winding the magnetic tape material on a mandrel, annealing, and impregnating with epoxy. The mandrel is then removed to maximize the core cross section. In order to minimize flux leakage losses in the toroids, the wires are preferably wound densely, with minimal gaps between turns. This is achieved through the use of closely wound round wire or flat wire. However, other techniques may be used, including depositing the winding by plating or sputtering (the insulating spiral being obtained by masking or etching), or by a flexible printed circuit board construction. Thin insulators are used to keep this winding in close proximity to the conductive layer. Additional capacitors can be installed and connected in parallel with the primary windings to reduce the resonant frequency.

Referring again to FIG. 9, low-loss current-loop inductive coupler 110 includes first element 131 that defines a first axis Y—Y, a first axial bore 136, and a first sealing face 135. It further includes first electrically conductive coil 142 wound about first ring-like core 141. Core 141 is oriented in a plane transverse to axis Y—Y, surrounding first bore 136, and located within first element 131. First element 131 has a male tapered pipe-thread 132, and a first high-conductivity, low-permeability shaped belt 133 partially enclosing first core 141. First high-conductivity, low-permeability shaped belt 133 is shaped to mate with a complementary second high-conductivity, low-permeability shaped belt 153 of an adjacent pipe joint second end element having a corresponding second electrically conductive coil wound around a second ring-like core. The two cooperate to create the closed electrical conducting toroidal path 124 of FIG. 12. Path 124 encloses both cores when inductive coupler elements 131 and 151 are mated. Protective coatings 138 and 158 surround first and second cores, respectively. Path 124, seal-region high-conductivity, low-permeability layer contact rim 123, and thread-region high-conductivity, low-permeability layer contact rim 128 are shown in FIG. 10.

FIG. 10 shows first element 131 defining first conduit 134 enclosing first electrical cable 143. Likewise, second element 151 defines second conduit 154 enclosing second electrical cable 163.

Figure 11:
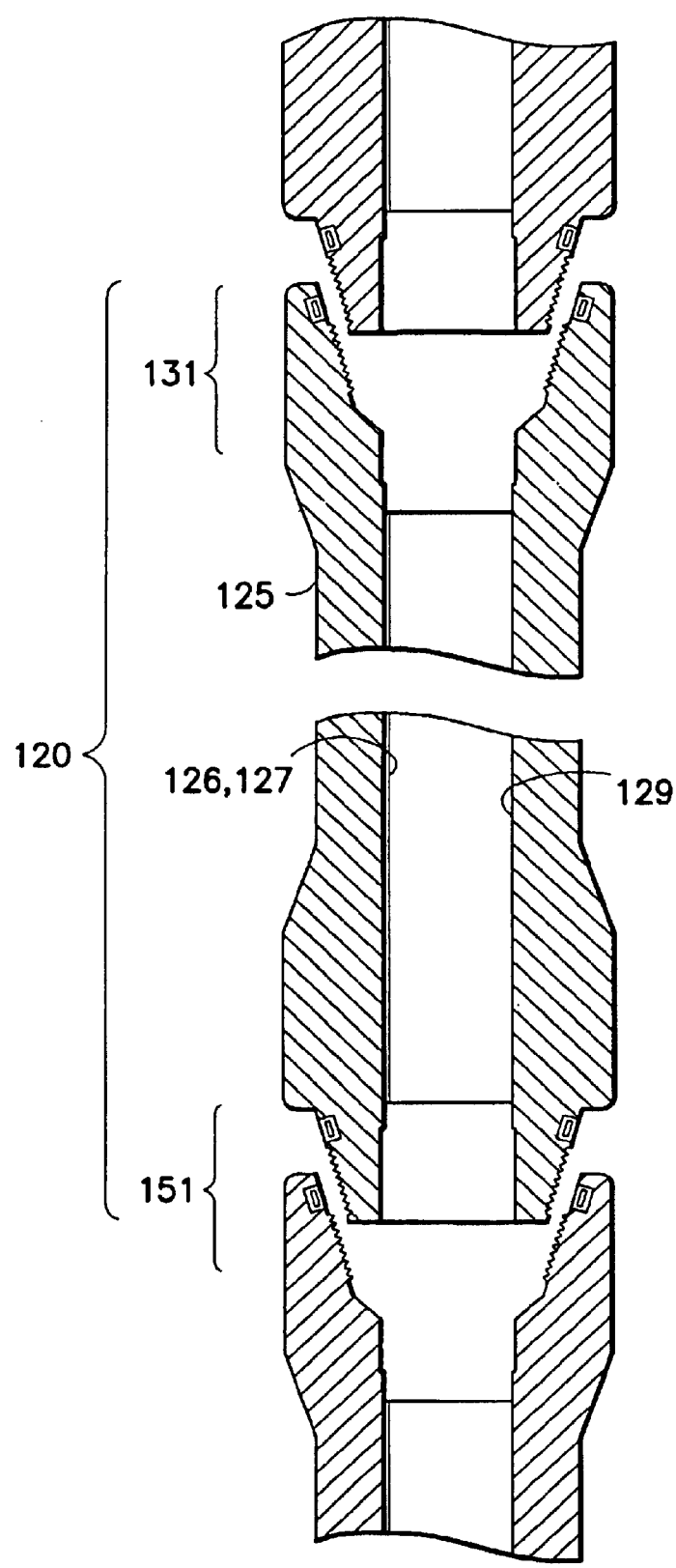
FIG. 11 is a cross section view of wired pipe joint according to the present invention having first and second elements of the low-loss inductive coupler of FIGS. 9 & 10.

FIG. 11 is a cross section view of a wired pipe joint according to the present invention having first and second elements of the low-loss inductive coupler of FIGS. 9 and 10. FIG. 11 shows current-loop wired pipe joint 120 having an elongate tubular shank 125. Shank 125 defines an axis and an axial bore 129, a first current-loop inductive coupler element 131, a second current-loop inductive coupler element 151, and an electrical cable 127. Cable 127 extends axially within at least a portion of the bore. Cable 127 is shown in FIG. 11 supported by mandrel 126. Alternatively, cable 127 could be located in a groove cut into the outer surface of the pipe joint. Or cable 127 could be in a gun drill hole within the length of the pipe joint wall. Or it could be within the pipe bore of the pipe joint as a secured cable or as loose wires.

The reliability of both the flux-loop inductive coupler system and the current-loop inductive coupler system could be improved by introducing redundant cables. Two pairs (or more) of wires could be run from end to end on each joint and two independent coils could be wound in each coupler, so that a single broken wire would not cause a system failure. If the wires are independently insulated, any one of them could be shorted to mass without bringing down the system.

Figure 12:
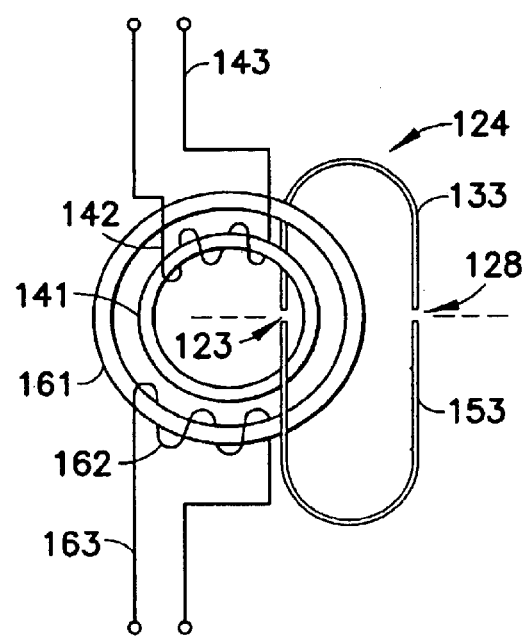
FIG. 12 is an electromagnetic model of the first element of the embodiment of FIG. 9.

FIG. 12 is an electromagnetic model of the first element of the embodiment of FIGS. 9 and 10. Item numbers correspond to items illustrated in FIG. 11.

Figure 13:
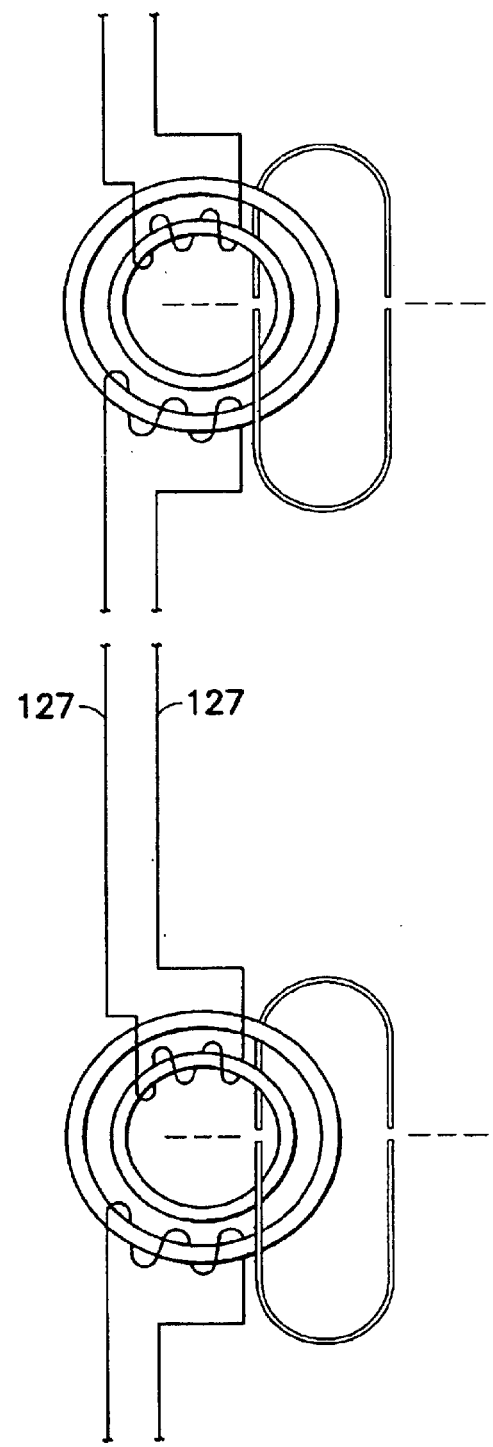
FIG. 13 is an electromagnetic model of the wired pipe joint of FIG. 11.

FIG. 13 is an electromagnetic model of the wired pipe joint of FIG. 11, showing electrical cable 127.

Third Embodiment

Figure 14:
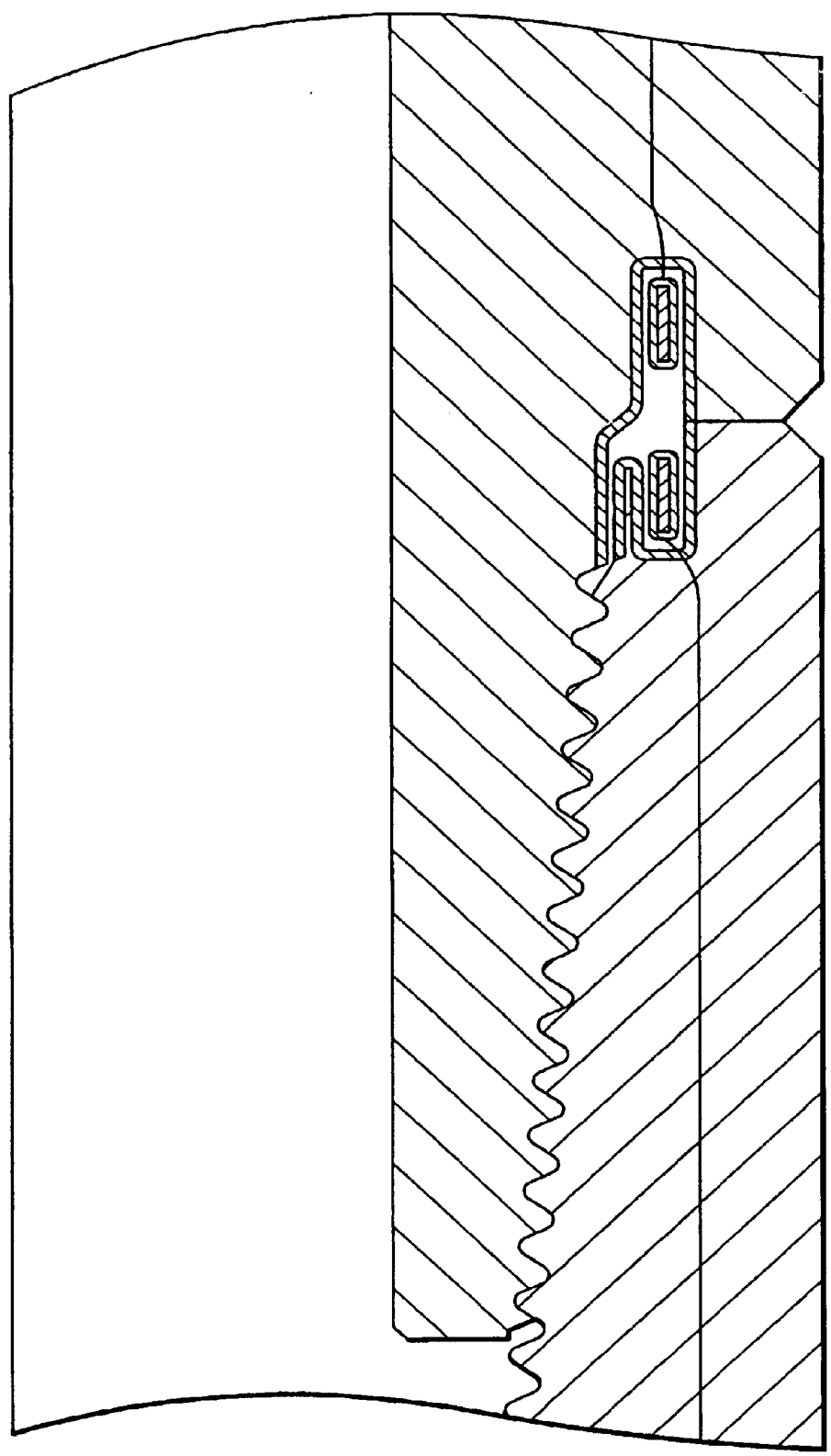
FIG. 14 is a cross section view of a third embodiment of a low-loss inductive coupler having current-loop inductive coupler elements.

FIG. 14 is a cross section view of a third embodiment of a low-loss inductive coupler according to the present invention having first and second current-loop inductive coupler elements. In this embodiment, first and second cores and first and second high-conductivity, low-permeability layers are located proximate to the sealing faces of the wired pipe joint.

Fourth Embodiment

Figure 15:
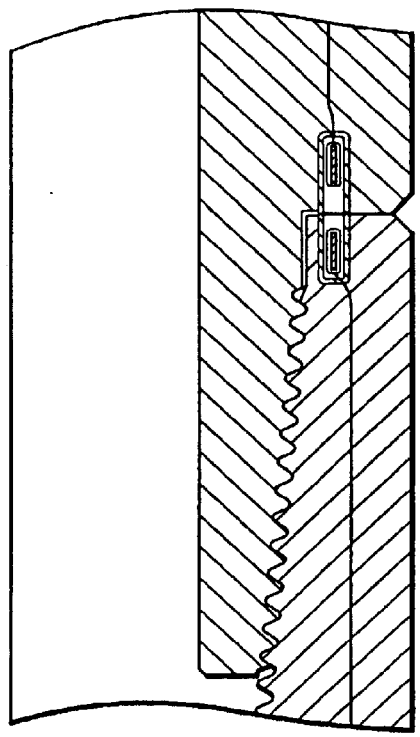
FIG. 15 is a cross section view of a fourth embodiment of a low-loss inductive coupler having current-loop inductive coupler elements.

FIG. 15 is a cross section view of a fourth embodiment that is quite similar to the third embodiment in that the high-conductivity, low-permeability layers are located proximate to the sealing faces of the wired pipe joint.

Fifth Embodiment

In a fifth embodiment (not shown), the wired pipe joint comprises an elongate tubular shank made of a high-conductivity, low-permeability material. The shank defines a first high-conductivity, low-permeability shaped belt at a shank first end, and a second high-conductivity, low-permeability shaped belt at a shank second end.

Sixth Embodiment

Figure 16:
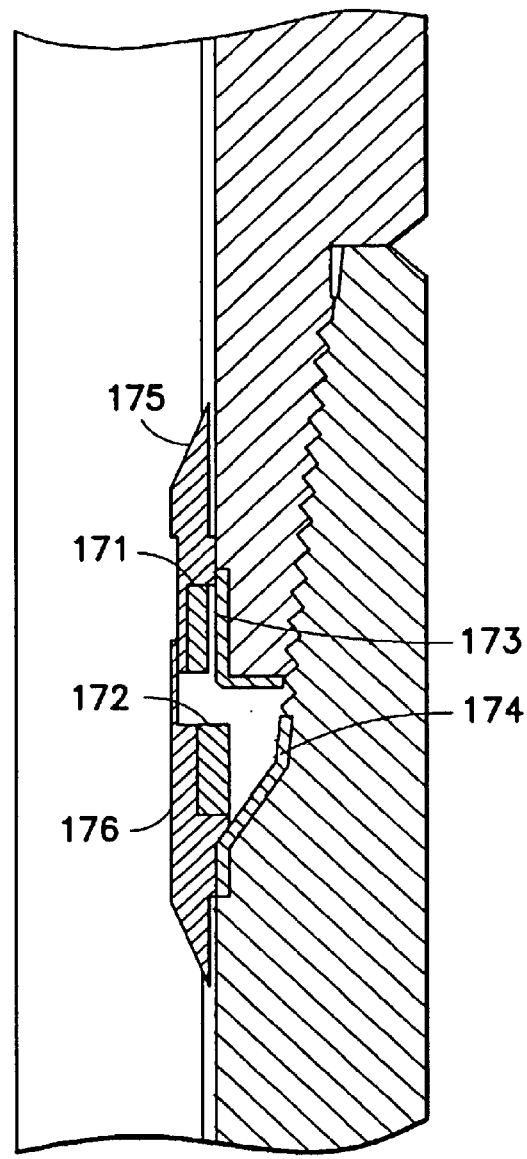
FIG. 16 is a cross section view of a sixth embodiment of a low-loss inductive coupler having current-loop inductive coupler elements.

FIG. 16 is a cross section view of a sixth embodiment of a low-loss inductive coupler according to the present invention having first and second current-loop inductive coupler elements within the pipe joint bore.

In a first version, first ring-like core 171 and its associated coils of this embodiment are mounted to first high-conductivity, low-permeability tubular support member 175. Support member 175 is locally attached to the first pipe joint inside the first pipe joint bore. Likewise, second ring-like core 172 and its associated coils are mounted to second high-conductivity, low-permeability tubular support member 176. Support member 176 is locally attached to the second pipe joint inside the second pipe joint bore. When the coupler elements are mated, first high-conductivity, low-permeability shaped belt 173, second high-conductivity, low-permeability shaped belt 174, and the two high-conductivity tubular support members 175 and 176 form a high-conductivity closed electrical conducting toroidal path. This path surrounds both cores and their coils, and functionally corresponds to path 124 in FIG. 12. Support members 175 and 176 could be made of any suitable high-conductivity, low-permeability material such as beryllium copper, or of a magnetic material such as steel with a coating of high-conductivity, low-permeability material.

Figure 17:
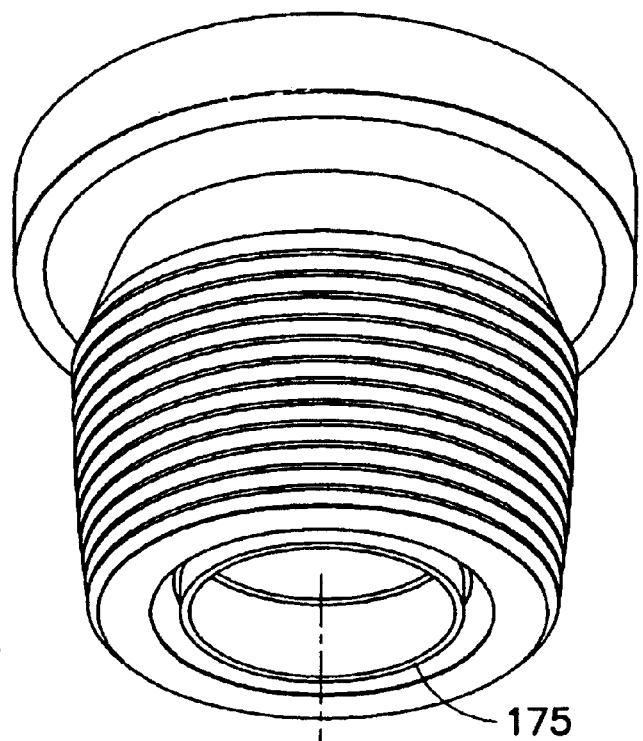
FIG. 17 is a perspective view of a threaded male end of a wired pipe joint containing a first element of the embodiment of FIG. 16.
Figure 18:
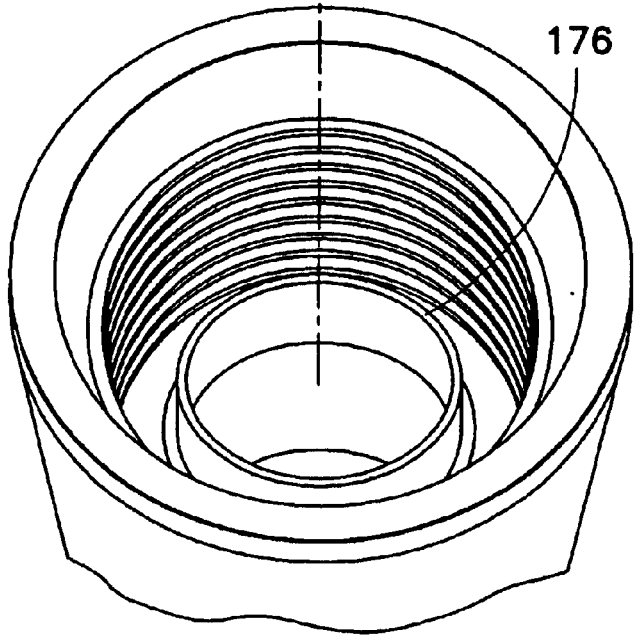
FIG. 18 is a perspective view of a threaded female end of a wired pipe joint containing a second element of the embodiment of FIG. 16.

FIG. 17 is a perspective view of a threaded male end of a wired pipe joint containing a first element of the embodiment of FIG. 16. FIG. 18 is a perspective view of a threaded female end of a wired pipe joint containing a second element of the embodiment of FIG. 16.

Seventh Embodiment

A seventh embodiment (not shown) provides a wired pipe joint having a shank made of a high-conductivity, low-permeability material, such as beryllium copper.

Eighth Embodiment

A seventh embodiment provides a pair of short inductive coupler subs, one with a male thread, the other with a female thread. Each sub has a short shank made out of a high-conductivity, low-permeability material, such as beryllium copper, and a single inductive coupler element. The seventh embodiment is not shown but uses components disclosed herein above as part of the second embodiment. The single inductive coupler is similar to one of the two ends of the second embodiment. A first sub would be screwed onto the first end of conventional (non-wired) pipe joint and a second sub would be screwed onto the second end of the pipe joint to make a wired pipe joint assembly (not shown). The two inductive coupler elements of this wired pipe joint assembly would be electrically coupled to each other at the drill head by a cable threaded through the bore of the pipe joint. The use of inductive coupler subs triples the number of threaded joints, but does not increase the number of inductive coupler elements needed for a given drill string. The method of use requires that at least one cable connection be made after the inductive coupler subs are installed.

Ninth Embodiment

A ninth embodiment provides a pair of short inductive coupler subs, one with a male thread, the other with a female thread. Each sub has a short shank, a single inductive coupler element, and a support member made out of a high-conductivity, low-permeability material. The ninth embodiment is not shown but uses components disclosed herein above as part of the sixth embodiment.

What is claimed is:

1. An inductive coupler for a wired pipe joint, comprising:
    a first flux-loop inductive coupler element including a ring-like first core having high magnetic permeability, said first core defining a first axis, a first exterior substantially cylindrical face, and a first interior conical-section annular face, the first interior face defining a first larger-diameter face, a first smaller-diameter face, and an annular first groove, the first groove located between the first larger-diameter face and the first smaller-diameter face, and a first electrically conductive coil wound within said first groove; and
    a second flux-loop inductive coupler element including a ring-like second core having high magnetic permeability, said second core defining a second axis, a second interior substantially cylindrical face and a second exterior conical-section annular face, the second exterior face defining a second smaller-diameter face, a second larger-diameter face, and an annular second groove, the second groove located between the second smaller-diameter face and the second larger-diameter face, and a second electrically conductive coil wound within said second groove;
    wherein said first and second elements are adapted to mate with the first larger-diameter face facing the second larger-diameter face, and the first smaller-diameter face facing the second smaller-diameter face;
    whereby said first and second cores form a low-reluctance closed ring-like magnetic path around said first and second coils.

2. An inductive coupler according to claim 1, wherein the first interior conical-section annular face defines a conical shape with an apex on the first axis, and the second exterior conical-section annular face defines a conical shape with an apex on the second axis.

3. An inductive coupler according to claim 1, wherein each core defines a conduit for passage of at least one electrical cable coupled to its coil.

4. In a wired pipe joint, a first flux-loop inductive coupler element for electrical coupling with a second flux-loop inductive coupler element, said first flux-loop inductive coupler element comprising:
    a ring-like core having high magnetic permeability and a conical-section annular face transverse to the plane of said core, the conical-section annular face having an annular groove dividing the conical-section annular face into a larger-diameter conical-section annular face and a smaller-diameter conical-section annular face; and
    a coil wound within the annular groove.

5. An inductive coupler element according to claim 4, further comprising a tubular support member adapted to mount said inductive coupler element within the bore of a wired pipe joint.

6. An inductive coupler element according to claim 4, wherein said core defines a conduit for passage of at least one electrical cable coupled to said coil.

7. An inductive coupler element according to claim 4, wherein said coil does not substantially protrude forward of the conical-section annular face.

8. A wired pipe joint, comprising:
    an elongate tubular shank defining an axial bore and first and second ends;
        electrical coupling means for providing electrical coupling from a location in the first end of said shank to a location in the second end of said shank;
    a first flux-loop inductive coupler element located within the first end of said shank and connected to a first end of said electrical coupling means; and
    a second flux-loop inductive coupler element located within the second end of said shank and connected to a second end of said electrical coupling means;
    wherein each flux-loop inductive coupler element includes a ring-like core having a high magnetic permeability and a conical-section annular face transverse to the plane of said core, the conical-section annular face having an annular groove dividing the conical-section annular face into a larger-diameter conical-section annular face and a smaller-diameter conical-section annular face; and an electrically conductive coil wound within the annular groove.

9. A wired pipe joint according to claim 8, further comprising a first tubular support member adapted to mount said first inductive coupler element within a first end of the axial bore, and a second tubular support member adapted to mount said second inductive coupler element within a second end of the axial bore.

10. A wired pipe joint according to claim 8, wherein each said ring-like core defines a conduit for passage of at least one electrical cable coupled to said coil.

* * * * *